(12) United States Patent
Fink

(10) Patent No.: US 9,080,620 B2
(45) Date of Patent: Jul. 14, 2015

(54) METHOD FOR DETERMINING A FILLING QUANTITY

(71) Applicant: Deere & Company, Moline, IL (US)

(72) Inventor: Manuel Fink, Maxdorf (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/386,892

(22) PCT Filed: Mar. 21, 2013

(86) PCT No.: PCT/EP2013/055964
§ 371 (c)(1),
(2) Date: Sep. 22, 2014

(87) PCT Pub. No.: WO2013/139925
PCT Pub. Date: Sep. 26, 2013

(65) Prior Publication Data
US 2015/0039197 A1 Feb. 5, 2015

(30) Foreign Application Priority Data

Mar. 23, 2012 (DE) .................... 10 2012 005 765

(51) Int. Cl.
F16D 48/06 (2006.01)
F16D 48/02 (2006.01)

(52) U.S. Cl.
CPC .............. *F16D 48/066* (2013.01); *F16D 25/14* (2013.01); *F16D 2500/1026* (2013.01); *F16D 2500/1045* (2013.01); *F16D 2500/10412* (2013.01); *F16D 2500/111* (2013.01); *F16D 2500/30415* (2013.01); *F16D 2500/30426* (2013.01); *F16D 2500/30428* (2013.01); *F16D 2500/5014* (2013.01); *F16D 2500/70406* (2013.01)

(58) Field of Classification Search
CPC ............................. F16D 25/14; F16D 48/066
USPC ........................................................ 701/68
See application file for complete search history.

(56) References Cited

U.S. PATENT DOCUMENTS

| 4,671,394 | A | * | 6/1987 | Braun | 192/3.57 |
| 4,685,356 | A | * | 8/1987 | Iwatsuki | 475/120 |
| 2004/0254705 | A1 | * | 12/2004 | Bitzner | 701/50 |
| 2005/0177294 | A1 | * | 8/2005 | Jiang et al. | 701/67 |
| 2009/0281700 | A1 | * | 11/2009 | Petzold et al. | 701/68 |

* cited by examiner

Primary Examiner — Edwin A Young

(57) ABSTRACT

The invention relates to a method for determining the filling quantity in the actuating system of a clutch arrangement which has a forward clutch and a reverse clutch for a respective connection of an input shaft to an output shaft for drive purposes. A first controllable actuating unit is provided for actuating the forward clutch, and a second controllable actuating unit is provided for actuating the reverse clutch.

8 Claims, 3 Drawing Sheets

METHOD FOR DETERMINING A FILLING QUANTITY

CROSS-REFERENCE TO RELATED APPLICATIONS

This is a national stage application filed under 35 U.S.C. 371 of International Application No. PCT/EP2013/055964 filed Mar. 21, 2013, which claims priority under 35 U.S.C. 119 to German Patent Application No. 102012005765.2 filed Mar. 23, 2012.

FIELD OF THE DISCLOSURE

The invention relates to a method for determining the filling quantity in the actuating system of a clutch arrangement which has a forward clutch and a reverse clutch for the respective connection of an input shaft to an output shaft for drive purposes wherein a first controllable actuating unit is provided for actuating the forward clutch, and a second controllable actuating unit is provided for actuating the reverse clutch.

BACKGROUND

In tractors of the John Deere mark gearboxes are used whose forward clutch and reverse clutch of the reversing unit are released during operation of each other clutch so that the actuating unit relevant to the clutch is not only switched without pressure but the hydraulic oil located therein is at least partially emptied. In this situation air is located in the actuating unit which prior to switching the corresponding clutch again by means of the actuating unit has to be removed from same so that a hydraulic pressure can be built up in the actuating unit. This means during operation of the tractor that with each change of driving direction a partial emptying of the actuating unit of the one clutch, and a filling of the actuating unit of the other clutch takes place accordingly. The actual release of the one clutch and switching of the other clutch for the other driving direction is a function of the clutch pedal actuated by the operator so that the release of the clutch pedal controls the ventilation and filling of the actuating unit of the clutch which is to be switched. For the operating comfort which the operator experiences it is on the one hand decisive that the actuating unit is ventilated in the shortest possible, precisely determined, time interval so that from the moment of the complete ventilation and after regulating forwards with a low clutch pressure a deliberate and dosed modulation of the clutch pressure can take place by the operator by means of the clutch pedal. Whereas too long a time interval, within which the actuating unit is first completely ventilated, would leave the operator with the feeling of a sluggish gear change, it is on the other hand decisive for the operating comfort which clutch pressure is set with the optimum possible pedal position for the operator immediately after the ventilation of the actuating unit of the clutch which is to be switched. Too high a clutch pressure is hereby particularly detrimental for the operating comfort since, for the operator, too high a clutch pressure manifests itself as an uncontrollable fierce bite of the clutch arrangement during a change of driving direction. Too low a clutch pressure immediately after the ventilation of the actuating unit would likewise appear to the operator as a sluggish gear change. For the best possible satisfactory operating comfort it is thus a matter of determining this time interval of the ventilation and the adjoining clutch pressure immediately following thereon and matching these with one another.

In order to avoid these unacceptable influences on the operating comfort and in view of the fact that each gearbox or each clutch arrangement is subject to tolerances even in high quality production, each gearbox had to run through a calibrating process before starting up a tractor wherein precisely the amount of hydraulic oil which is required for completely ventilating the actuating unit, and precisely the clutch pressure which is applied after ventilation whilst avoiding a fierce bite of the clutch, are determined. Present-day calibrating processes require a load on the output shaft of the clutch arrangement. For certain gearboxes which are installed behind the clutch arrangement, this means that a power flow is switched on from the output shaft of the clutch arrangement via the gearbox and the differential to the drive wheels. In unfavorable cases and those which have to be avoided under all circumstances this power flow can lead to a clear movement of the vehicle during the calibrating process, with the corresponding possibilities of injury in the vicinity of the tractor.

SUMMARY

Based on this the object of the present invention is to provide a calibrating process which can be carried out with a freely rotating output shaft of the clutch arrangement.

This is achieved according to the invention by a method according to claim 1 for determining the filling quantity in the actuating system of a clutch arrangement which has a forward clutch and a reverse clutch for a connection of an input shaft to an output shaft for drive purposes wherein a first controllable actuating unit is provided for actuating the forward clutch and a second controllable actuating unit is provided for actuating the reverse clutch.

Through this method it is possible in an advantageous manner to dispense with a switched power flow between the output shaft of the clutch arrangement and the drive wheels of an agricultural utility vehicle in which the clutch arrangement is installed. The inventive idea is rather based on connecting the output shaft through one of the clutches for a defined time interval in driving engagement with the input shaft of the clutch arrangement driven by the engine of the agricultural utility vehicle, and on allowing the output shaft to rotate freely afterwards only braked by parasitic loads, in order to connect it again to the input shaft in this condition via the other clutch.

Thus on the one hand the case can arise hereby where the output shaft after coupling with the engagement shaft experiences no change in its speed, from which it can be concluded that the corresponding actuating unit has not yet been ventilated and still no clutch pressure was built up. On the other hand the case can arise where the output shaft after coupling with the input shaft undergoes a clear or abrupt change in its speed, from which it can be concluded that the actuating unit is ventilated and in addition a no longer low clutch pressure was already built up which in normal operation would lead to the undesired fierce bite.

Preferably a method step is proposed in which during a time interval $t_0$ an at least partial emptying of the second of the first or second actuating unit takes place. It is hereby ensured that the actuating unit whose filling quantity is to be determined and/or calibrated, is emptied at the start of the proceedings.

Preferably the time interval $t_0$ in dependence on the speed $n_E$ of the input shaft amounts to between 5 and 10 seconds. This means that at low speed of the input shaft the time interval $t_0$ is selected longer, and vice versa. In each case the desired sufficient emptying of the actuating unit can hereby be guaranteed.

The time interval $t_1$ preferably ends when, by comparing the speeds $n_E$, $n_A$ of the input shaft and the output shaft, an at least approximately slip-free state of the forward clutch or reverse clutch controlled by the first of the first or second actuating unit is detected. A slip-free state means that the input speed has a ratio to the output speed which corresponds precisely to a transmission ratio between the two shafts. The transmission ratio can hereby be different from 1, by way of example if a planetary wheel gear is switched in between the two shafts.

The factor X=0.75 and the factor Y=2 preferably applies. A factor X=0.75 is favourable if by way of example the starting speed of the output shaft is 2000 n/min. In a practical implementation of the method this can mean that a typical time span of approximately 500 ms elapses until the speed has dropped to 1500 n/min. A factor Y=2 is favourable since this means a sudden halving of the speed of the output shaft so that an abrupt braking can almost certainly be suggested.

The actuating units for filling and emptying preferably each comprise an electrically controllable valve wherein the valve for filling the at least partially emptied second of the first or second actuating unit during the time interval $t_3$ is opened at least approximately completely. A maximum through-flow through the valve is hereby guaranteed so that the time span during which the valve is opened in order to fill the actuating unit can be kept short.

The clutch arrangement preferably comprises a transmission stage which can be locked by means of the reverse clutch relative to a housing of the clutch arrangement, for the reverse driving connection of the input shaft to the output shaft. It is proposed in particular that the transmission stage is designed as a planetary wheel gear.

The method preferably comprises the further steps: applying a hydraulic pressure $p_2$ to the first of the first or second actuating unit over a time interval $t_4$, increasing the hydraulic pressure $p_2$ in the actuating unit over a time interval $t_5$ and measuring the hydraulic pressure $p_2$ over the course of the time interval $t_5$, storing the mean hydraulic pressure $p_{2,mittel}$ when a vibration of the hydraulic pressure $p_2$ exceeds an amplitude level.

BRIEF DESCRIPTION OF THE DRAWINGS

The method according to the invention will now be described below with reference to the drawings. These show.

DETAILED DESCRIPTION

Figure 1:
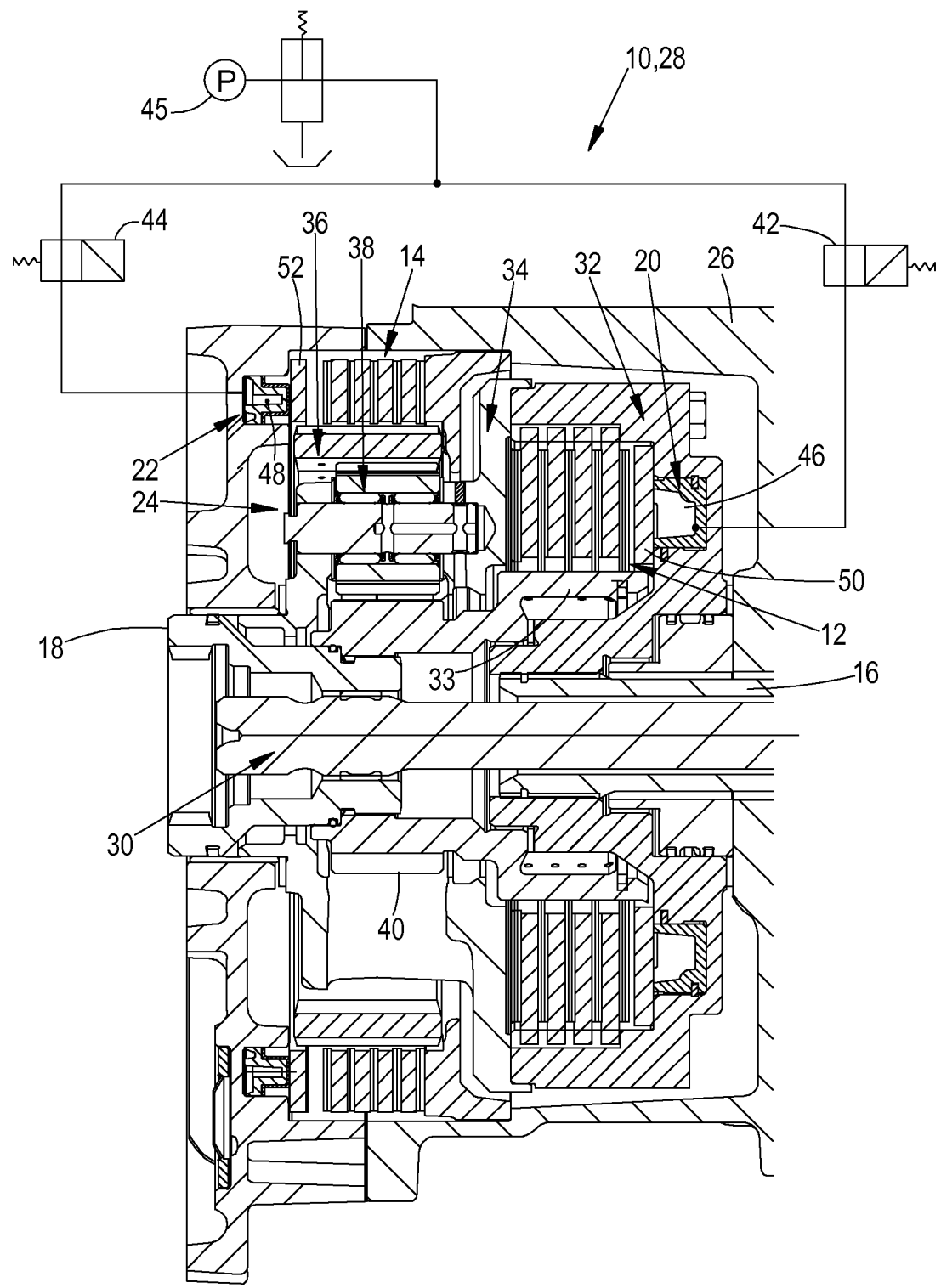
FIG. 1 a longitudinal section through a clutch arrangement.

FIG. 1 shows a clutch arrangement 10 for an agricultural utility vehicle, which is designed as a reversing unit 28 and is arranged in a housing 26. An input shaft 16 and an output shaft 18 are provided which are both designed as hollow shafts. A shaft 30, which is not described in further detail, runs inside the input shaft 16 and output shaft 18 for driving by way of example the power take-off shaft of the utility vehicle.

The input shaft 16 can be connected by a forward clutch 12 in driving engagement with the output shaft 18 so that the two shafts 16, 18 have the same direction of rotation. The forward clutch 12 is here designed as a multi-plate clutch. The outer plate support 32 is connected to a planetary wheel support 34 of a transmission stage 24 which is designed as a double planetary wheel gearing. The hollow wheel 36 of the double planetary wheel gearing is able to be locked relative to the housing 26 by a reverse clutch 14, also called a reverse brake. The reverse clutch is likewise designed as a multi-plate clutch. The planetary wheels 38 mounted on the planetary wheel support 34 drive the sun wheel 40 radially on the inside, the sun wheel being in driving connection in suitable manner both with the inner plate support 33 of the forward clutch 12 and also with the output shaft 18. The input shaft 16 can be connected in reverse driving engagement with the output shaft 18 by the reverse clutch 14 and the transmission stage 24 so that the two shafts 16, 18 have opposite directions of rotation. The forward clutch 12 and the reverse clutch 14 are each controllable by the actuating units 20, 22. The actuating units 20, 22 each comprise an electromagnetically controllable valve 42, 44 through which hydraulic oil which is set under pressure via a hydraulic pump 45, can be supplied to the relevant pressure chambers 46, 48 of the actuating units 20, 22. The actuating units 20, 22 each act on the relevant pressure plates 50, 52 of the clutches 12, 14. The friction lamellar plates of the clutches 12, 14 are biased towards one another via the pressure plates 50, 52. FIG. 1 does not show, since they are offset relative to the sectional plane, the compression springs which are arranged circumferentially and bias the pressure plates 50, 52 away from the friction lamellar plates when there is no hydraulic pressure prevailing in the actuating units 20, 22.

During operation of the agricultural utility vehicle the actuating unit 20, 22 of the clutch 12, 14, which need not be connected just for moving the vehicle, is emptied at least in part of hydraulic oil in order to ensure a complete release of the relevant clutch 12, 14. This means that the pressure chamber 46, 48 of the relevant actuating unit 20, 22 is filled at least in part with air.

Figure 2A:
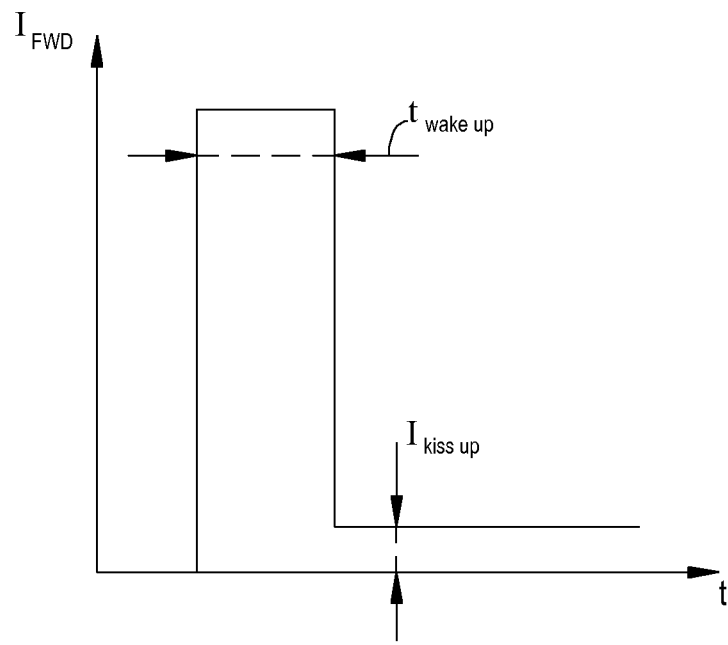
FIG. 2a the path of the current for actuating the valve of the actuating unit for the forward clutch.
Figure 3:
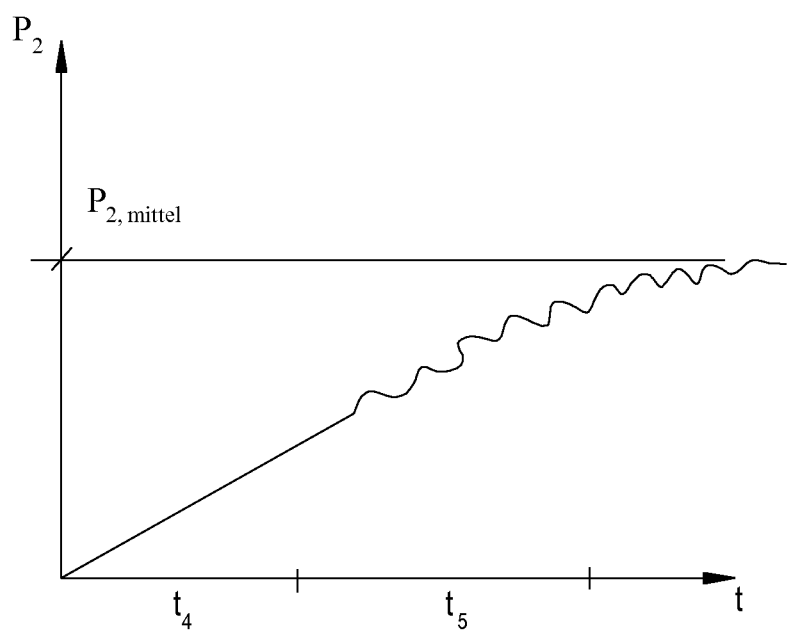
FIG. 3 the path of the clutch pressure of a clutch when determining the kiss-up pressure.

The method according to the invention serves to determine accurately this amount of oil wherein this amount of oil is not a quantity of oil to be determined flat-rate for one type of gear, but rather is to be determined individually for each gear as a result of manufacturing tolerances. With the method according to the invention further method steps can be provided which determine exactly the clutch pressure which has to be set after ventilating the just controlled actuating unit 20, 22 so that there is no sluggish shift feeling. This clutch pressure is then correctly set when it is balanced with the resetting forces of the compression springs. FIG. 2a shows diagrammatically and by way of example for the forward clutch 12 the path of the current $I_{FWD}$ with which the valve 42 is loaded, applied over time. It should be noted that the current $I_{FWD}$ initially rises for a defined time interval, which can also be called a wake-up pulse duration, to a high level. During this time the valve 42 is fully opened and the actuating unit 20 is ventilated. Following this time interval the current $I_{FWD}$ is reduced to a level at which the forward clutch 12 already builds up a minimal force connection. The clutch pressure prevailing in this condition can also be called a kiss-up pressure and involves characteristic and measurable vibrations in the oil pressure, as can be seen in FIG. 3.

The method according to the invention will now be described below with reference to FIG. 2b. For a clutch arrangement 10 which comprises a forward clutch and a reverse clutch 14 the method must be run through individually for each clutch 12, 14 wherein only the method for use with the forward clutch 12 will be described below.

Figure 2B:
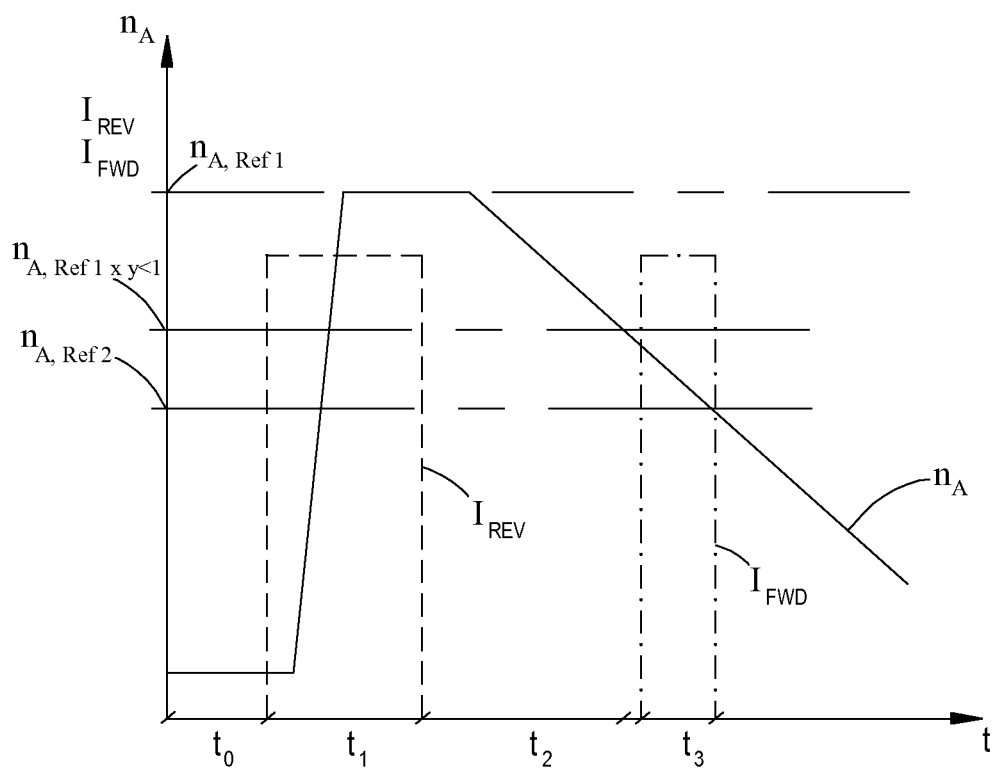
FIG. 2b the path of the currents of the actuating units and the speed of the output shaft during implementation of the method according to the invention.

FIG. 2b shows recorded over the time axis first the speed $n_A$ of the output shaft 18. The current $I_{FWD}$ and the current $I_{REV}$ are furthermore recorded over the time axis. These are the currents with which the valves 42, 44 of the actuating units 20, 22 are each charged for opening. At the start of the process the input shaft 16 is driven at a speed $n_E$ of by way of example 2000 n/min. The constant speed of the input shaft 16 is not shown registered in FIG. 2b. As a result of parasitic force engagement effects the output shaft 18 is rotated along at a low speed. The speed of the output shaft 18 is represented in FIG. 2b by the solid line. The actuating unit 20 of the forward clutch 12 is emptied within a time interval $t_0$ so that air is located in the pressure chamber 46.

During a following time interval $t_1$ a current $I_{REV}$ is supplied to the valve 44 of the actuating unit 22 of the reverse clutch 14 so that the valve 44 is opened at least approximately completely and the reverse clutch 14 is charged with an oil pressure $p_1$. The current $I_{REV}$ is represented by the dotted line in FIG. 2b. Since here in this case the transmission stage 24 is a reversing unit the output shaft 18 rotates in the opposite direction of rotation to the input shaft 16. The speed $n_A$ of the output shaft 18 is represented in FIG. 2b by the solid line. The time interval $t_1$ ends when from a comparison of the speed $n_E$ of the input shaft 16 with the speed $n_A$ of the output shaft 18 an at least approximately slip-free state of the controlled reverse clutch 14 is detected. At the end of the time interval $t_1$ the speed $n_A$ of the output shaft 18 is measured and stored as a first reference speed $n_{A,Ref1}$.

Likewise at the end of the time interval $t_1$ the oil pressure $p_1$ in the actuating unit 22 of the reverse clutch 14 is released and at least partially emptied so that the output shaft 18 in the following in the widest sense rotates freely or is no longer driven and is only braked by parasitic loads.

The speed $n_A$ of the output shaft 18 is measured continuously over a following time interval $t_2$ wherein the speed $n_A$ of the output shaft 18 is braked as a result of the parasitic loads acting on it. The end of the time interval $t_2$ is reached when the speed $n_A$ of the output shaft 18 has dropped to 75% of the first reference speed $n_{A,ref1}$. Depending on the useful area of the method a speed drop limit deviating from 75% can also be expedient. At the end of the time interval $t_2$ the mean acceleration $a_{mittel}$ of the output shaft 18 over the time interval $t_2$ is calculated and stored, wherein this is a time lag taking into account the amount. An empirical value for the length of the time interval $t_2$ can start from approximately 500 ms.

During a subsequent time interval $t_3$ the valve 42 of the at least partially emptied actuating unit 20 of the forward clutch 12 is charged with a current $I_{FWD}$ so that the valve 42 opens at least approximately completely and the actuating unit 20 is ventilated and filled with hydraulic oil. The current $I_{FWD}$ is represented by the chain-dotted line in FIG. 2b. The time interval $t_3$ is the wake-up pulse duration which is to be calibrated so that the length of the time interval $t_3$ is of decisive importance according to the invention insofar as for the satisfactory operation of the clutch arrangement 10 it is important that the time interval $t_3$ is to be measured neither too long nor too short. The time interval $t_3$ is the value which is to be calibrated or set with the method according to the invention.

During the initial run-through of the method according to the invention the time interval $t_3$ is selected so short that at the end the actuating unit 20 has not yet been fully ventilated, that means that there is still some air present in it. In this condition despite rotation of the clutch device 10 no hydraulic pressure will build up in the actuating unit 20 and the forward clutch 12 will furthermore not be active. At the end of the time interval $t_3$ the speed $n_A$ of the output shaft 18 is measured and stored as a second reference speed $n_{A,Ref2}$. The second reference speed $n_{A,Ref2}$ is then compared with a speed $n_{A,calc}$ of the output shaft 18 calculated at the end of the time interval $t_3$ from the first reference speed $n_{A,Ref1}$ and the mean acceleration $a_{mittel}$. The state just described, namely where the actuating unit 20 has still not been completely ventilated, is to be detected in that the second reference speed $n_{A,Ref2}$ is approximately equal to the calculated speed $n_{A,calc}$ of the output shaft 18. An additional braking of the output shaft 18 through the forward clutch 12 has not yet taken place since as a result of the incomplete ventilation of the actuating unit 20 this could not actively produce a power flow to the input shaft 16 driven furthermore with the speed $n_E$. 50 ms can be assumed as the empirical value for the time interval $t_3$ which is the basis of the first run-through of the method.

The previous method steps are then implemented again wherein now the actuating unit 20 is filled over a longer time interval $t_{3,verl}$. The time difference between the time interval $t_3$ and the time interval $t_{3,verl}$ can amount to 5 ms or 10 ms by way of example.

Should the length of the time interval $t_{3,verl}$ hereby be just sufficient that the actuating unit 20 is completely ventilated, then as a result of the centrifugal forces arising through the rotation of the clutch arrangement 10 a low oil pressure is set in the actuating unit 20 so that the forward clutch 12 produces a minimal force connection between the input shaft 16 and the output shaft 18 which causes a stronger braking of the output shaft 18 than the parasitic loads. This condition can be detected when comparing the second reference speed $n_{A,ref2}$ with the calculated speed $n_{A,calc}$ of the output shaft 18 in that the second reference speed $n_{A,Ref2}$ is indeed lower than the calculated speed $n_{A,calc}$, however not considerably lower, but only slightly lower.

Should the length of the time interval $t_{3,verl}$ be so long however that the actuating unit 20 is completely ventilated and already additionally a low oil pressure was built up in the actuating unit 20 through the influx of hydraulic oil, then a stronger power flow arises in the forward clutch 12 which causes a significant braking of the output shaft 18. This state can be detected when comparing the second reference speed $n_{A,Ref2}$ with the calculated speed $n_{A,calc}$ of the output shaft 18 in that the second reference speed $n_{A,Ref2}$ is considerably lower than the calculated speed $n_{A,calc}$. In this case the length of the time interval $t_{4,verl}$ is to be reduced.

As the last method step this length of the time interval $t_3$ or $t_{3,verl}$, at which the second reference speed $n_{A,Ref2}$ is slightly lower than the calculated speed $n_{A,calc}$, is stored. This value of the time interval $t_3$ is the wake-up pulse duration which is to be determined according to the invention.

In order to determine the required clutch pressure and/or the corresponding current $I_{FWD}$, with which the valve 42 has to be charged after the ventilation of the actuating unit 20, a hydraulic pressure $p_2$ is applied to the actuating unit 20 of the forward clutch 12 over a time interval $t_4$, as can be seen in FIG. 3. The pressure $p_2$ is to be a low pressure so that the forward clutch 12 still transfers no power flow. The time interval $t_4$ preferably amounts to some few seconds.

During a subsequent time interval $t_5$ the hydraulic pressure $p_2$ in the actuating unit 20 is raised by increasing the current $I_{FWD}$ and the hydraulic pressure $p_2$ is measured over the path of the time interval $t_5$. If a vibration of the hydraulic pressure $p_2$ exceeds an amplitude height this mean hydraulic pressure $p_{2,mittel}$ is stored. This mean hydraulic pressure $p_{2,mittel}$ is the kiss-up pressure. The corresponding current $I_{FWD}$ for this can likewise be stored. This operating state can be detected characteristically by the current flow or by the mean hydraulic pressure or pressure command respectively, and stored as the calibrating value according to the invention.

LIST OF REFERENCE NUMERALS

10 Clutch arrangement
12 Forward clutch
14 Reverse clutch
16 Input shaft
18 Output shaft
20 Actuating unit
22 Actuating unit
24 Transmission stage
26 Housing
28 Reversing unit
30 Shaft
32 Outer plate support
33 Inner plate support
34 Planetary wheel support
36 Hollow wheel
38 Planetary wheels
40 Sun wheel
42 Valve
44 Valve
45 Hydraulic pump
46 Pressure chamber
48 Pressure chamber
50 Pressure plate
52 Pressure plate

The invention claimed is:

1. A method for determining the filling quantity in the actuating system of a clutch arrangement comprising:
   operably coupling an input shaft and an output shaft using one of a forward clutch or a reverse clutch, wherein a first actuating unit is configured to actuate the forward clutch and a second actuating unit is configured to actuate the reverse clutch;
   continuously driving the input shaft at a first speed;
   applying a first hydraulic pressure to the first of a first or second actuating unit over a first time interval;
   measuring and storing the speed of the output shaft as a first reference speed and releasing the first hydraulic pressure in the first of the first or second actuating unit at the end of the first time interval;
   continuously measuring the speed of the output shaft and detecting the length of a second time interval at the end of which the speed of the output shaft has dropped to a factor $X<1$ of the first reference speed;
   calculating and storing the mean acceleration of the output shaft over the second time interval;
   filling the at least partially emptied second of the first or second actuating unit over a third time interval;
   measuring and storing the speed of the output shaft as a second reference speed at the end of the third time interval;
   comparing the second reference speed with a calculated speed of the output shaft calculated at the end of the third time interval from the first reference speed and the mean acceleration of the output shaft;
   repeating the previous steps with one of an extended time interval when the second reference speed is approximately equal to the calculated speed, or a short time interval when the second reference speed is less by a factor $Y>1$ than the calculated speed; and
   storing the length of the third time interval, the extended time interval, and the short time interval when the second reference speed is approximately less than the calculated speed.

2. The method of claim 1, further comprising:
   at least partially emptying the second of the first or second actuating unit over an initial time interval.

3. The method of claim 2, wherein the initial time interval amounts to between 5 and 10 seconds in dependence on the first speed of the input shaft.

4. The method of claim 1, wherein the first time interval ends when from a comparison of the speeds of the input shaft and the output shaft an at least approximately slip-free state is detected of the forward clutch or reverse clutch controlled by the first of the first or second actuating unit.

5. The method of claim 1, wherein the factor $X=0.75$ and the factor $Y=2$ applies.

6. The method of claim 1, further comprising:
   applying a second hydraulic pressure to the first of the first or second actuating unit over a fourth time interval;
   increasing the second hydraulic pressure in the first of the first or second actuating unit over a fifth time interval and measuring the second hydraulic pressure over the fifth time interval; and
   storing the mean hydraulic pressure when a vibration of the second hydraulic pressure exceeds an amplitude level.

7. The method of claim 1, wherein the first and second actuating units each comprise an electrically controllable valve, wherein the valve for filling the at least partially emptied second of the first or second actuating unit is at least approximately fully opened during the fourth time interval.

8. The method of claim 1, wherein the clutch arrangement comprises a transmission stage which can be locked by the reverse clutch relative to a housing of the clutch arrangement for the reversing drive connection of the input shaft to the output shaft.

* * * * *